Aug. 28, 1934.  H. F. SHINDEL  1,971,389
ADJUSTABLE NOSE BRIDGE
Filed Nov. 24, 1931
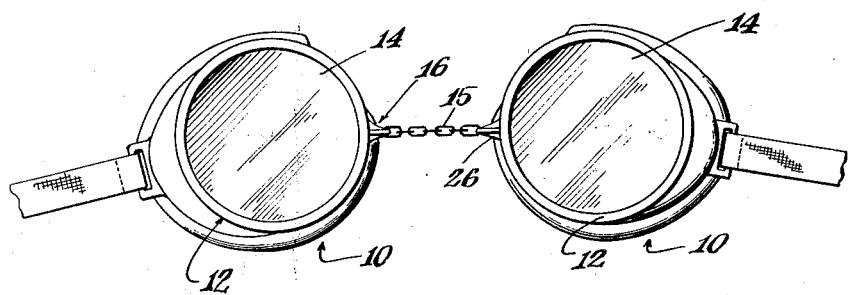
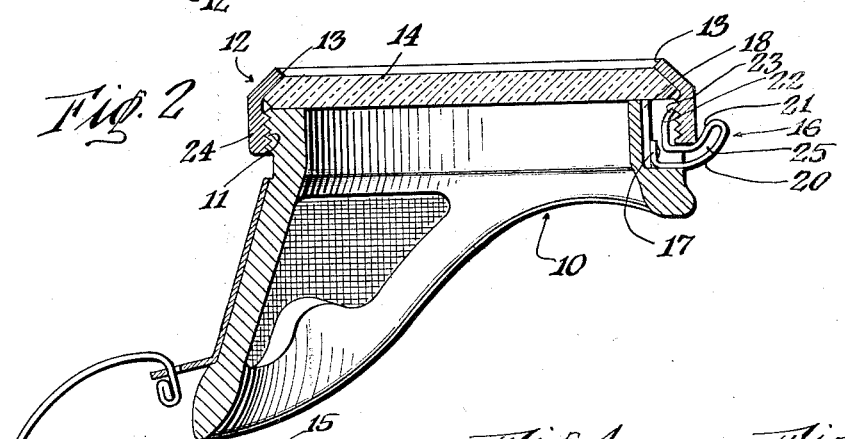
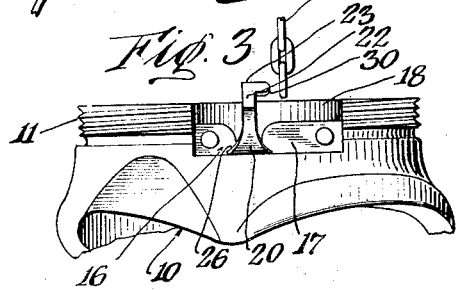
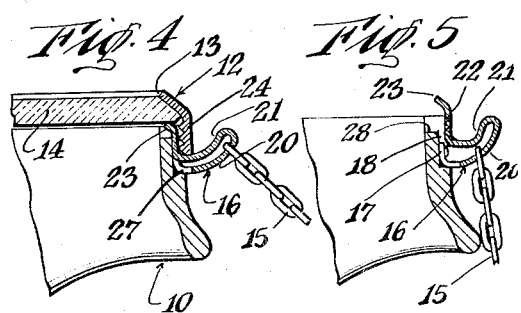
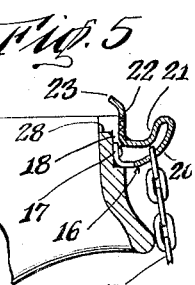
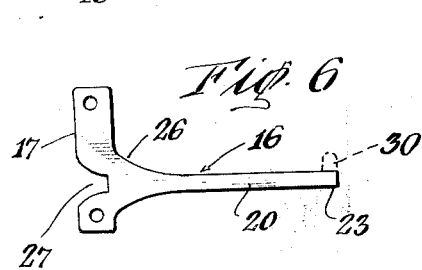
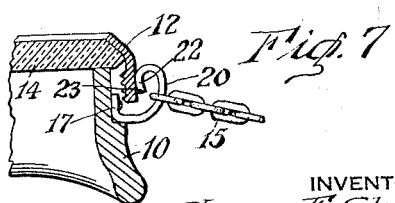
INVENTOR
Harry F. Shindel
BY
ATTORNEY Patented Aug. 28, 1934

1,971,389

UNITED STATES PATENT OFFICE 1,971,389

ADJUSTABLE NOSE BRIDGE

Harry F. Shindel, Reading, Pa., assignor to Willson Products, Inc., Reading, Pa., a corporation of Pennsylvania Application November 24, 1931, Serial No. 577,034

10 Claims. (Cl. 88—42)

My invention relates to goggles or eye-glasses which comprise separate lens holding frames and an interconnecting nose bridge. The invention relates particularly to a lens-frame-connecting nose bridge which may be simply and readily adjusted to vary the spread of the lens frames to suit the faces of various wearers.

In carrying out my invention I provide a flexible, apertured, member, such as a metallic chain, for connecting the lens frames to each other. Links at or adjacent the ends of the chain are adapted to extend over and be retained by hooks mounted on the inner sides of the lens frames. By selectively placing one or another of the links adjacent the ends of the chain over the hooks on the lens frames a desired spacing of the frames may be obtained. The ends of the chain retaining hooks extend beneath the lens retaining caps on the lens frames so that when the chain has been adjusted to obtain a desired spacing between the lens frames the chain is securely held at or adjacent its ends to prevent accidental detachment.

In the accompanying drawing:

Figure 1 is a front view of a pair of goggles embodying the adjustable, lens-frame-connecting bridge of my invention.

Figure 2 is a sectional view through one of the lens frames and shows the retaining hook for the adjustable lens-connecting chain.

Figure 3 is a fragmentary side view of a lens frame and illustrates the manner in which a retaining hook is attached to the lens frame.

Figure 4 is a fragmentary view partly in section of a lens frame embodying another form of chain retaining hook according to my invention.

Figure 5 is a fragmentary view of the lens frame and hook of Figure 4 showing the hook positioned to receive one of the chain links.

Figure 6 shows a metallic blank from which the hooks are formed.

Figure 7 is a fragmentary view of another form of retaining hook having its inwardly projecting end engaged by an exterior portion of the lens cap.

Referring first to Figures 1 to 3, the numeral 10 designates the lens frames, or eye-cups, which have threaded portions 11 at one end to receive similarly threaded rings or caps 12 provided with flanges 13 for retaining the lenses 14 in place. In accordance with the present invention the lens frames 10 are connected by an adjustable nose-bridge comprising a flexible, apertured, member, such as a metallic chain 15, which co-operates with hook members, designated as a whole by the numeral 16, for desirably varying the spread of frames which are secured on the wearer's head by any desirable form of attaching device.

Each of the hooks 16 is formed from a metallic blank, Fig. 6, and has a base portion 17 secured, as by riveting, in a recess 18 at the inner side of a lens frame 10. Hook 16 has a portion 20 extending forwardly from base 17 at substantially a right angle thereto and a reversely bent portion 21 extending toward recess 18 in frame 10 and terminating in a horn 22 extending upwardly substantially parallel to frame 10 and so positioned that the horn, or at least the end 23 thereof, lies within the threaded flange 24 of cap 12 when the latter is screwed onto frame 10. Reversely bent portion 21 of hook 16 overlaps the forwardly extending portion 20 thereof and together therewith forms a bight 25 with which various links of nose-bridge chain 15 may be detachably engaged. Adjacent base 17 the forwardly extending hook portion 20 may be reenforced by a tapered section 26 which may also serve to retain a chain link positioned outwardly of base 17 in the bight 25 of hook 16.

In the embodiment illustrated in Figures 1 and 2 the hook 16 is preferably rigid when attached to frame 10 with horn 22, and particularly the end 23 thereof, lying within the threaded flange 24 of cap 12 and parallel to the side of the frame. The spacing of the frames 10 may be varied to adapt the goggles to the spread of the eyes of a wearer on removal of either, or both, of the screw caps 10 by adjusting the length of nose-bridge chain 15. Chain 15 may be adjusted to obtain the desired spread of the lens frames 10 by slipping one or another of the links near the end of the chain over the horn 22 of hook 16 and drawing the link into the bight 25 formed by the overlapping of the reversely extending portions 20 and 21 of the hook. On replacing screw cap 12 the horn 22 of hook 16 is confined within the flange 24 of cap 12 so that the bight 25 is closed. If desired, the end 23 of horn 22 may be bent slightly outwards, as indicated in Fig. 2, so as to extend into the threads of cap 12 to be locked thereby when the cap is replaced. Thus, chain 15 is securely held against disengagement from the end 23 of hook 16 and the desired spacing of the lens frame 10 is maintained.

In the embodiment shown in Figures 4 and 5 the hook 16 is formed from a blank of resilient material so that when screw cap 12 is removed the horn 22 of the hook may be grasped and drawn outwardly, as shown in Fig. 5, to position the end of the hook to facilitate attachment or detachment of the nose-bridge chain 15. When the length of the flexible nose bridge 15 has been desirably adjusted by slipping one or another link near the end of the chain over the end 23 of hook 16 the horn 22 is bent back against frame 10, as in Fig. 4, base 17 being cut away or slotted at 27 to accommodate the upwardly extending portion of horn 22.

As in the arrangement previously described, the horn 22 of hook 16 is confined within the threaded flange 24 of cap 12 so that the link of the chain cannot be drawn over the end 23 of the hook when the cap is replaced.

The end 23 of horn 22 projects inwardly above a ledge 28 formed by cutting away a part of the threaded rim adjacent recess 18 and resiliently engages the inner side of lens 14 adjacent the flange 13 of cap 12 when the latter is replaced. Thus, the end 23 of horn 22 acts to maintain lens 14 against flange 13 of cap 12 and is in turn acted on by the lens to press the portion 21 of hook toward the underlying portion 20 restricting the space therebetween and closing the bight 25 of hook 16 so that a link of chain 15 is retained in the bight.

In the form shown in Figure 7 the horn 22 of the bridge retaining hook extends reversely to part 20 thereof and substantially parallel to the lens frame so that the end 23 of the horn is directed downwardly, rather than upwardly as in Figs. 2–5. Upon removal of lens cap 12 the effective length of the nose bridge may be adjusted by slipping the links over the end 23 of the horn. The hook is preferably of resilient material and when the lens cap is replaced the horn 22 bears against the exterior surface of the flange 24 of the cap and thus effectively retains the nose bridge in engagement with the hook.

Because of the natural tendency of the links of a chain to depend vertically when the chain is grasped to apply a link to hook 16, the application of a link to a hook may be more readily effected by holding the chain vertically and drawing the desired link over the end of the hook from the side. If desired, the end 23 of the hook 16 may be formed with a lateral projection 30, as shown in Fig. 3, to facilitate slipping the chain links over the end of the hook.

It will be readily seen from the above description that the flexibly connected lens frames may be readily varied in their spacing to suit any particular wearer by merely adjusting the length of the flexible nose bridge which is securely held in its adjusted position against accidental detachment as described above. Various types of flexible nose bridges may be employed and other changes and variations may be made without departing from the invention and I desire to include all such changes and variations within the scope of the appended claims.

What I claim is:

1. In a pair of goggles having lens frames, lens retaining caps thereon and a linked nose-bridge for connecting said frames; bridge retaining members fixed to said frames and having extending loop portions adapted to seat determined links of said nose bridge and inwardly extending ends lockingly engaged within said caps.

2. In a pair of goggles having lens frames and a flexible, apertured, nose-bridge for connecting said frames; hooks mounted on said frames and having horns extending adjacent the sides of said frames for selectively engaging apertures of said nose-bridge to effect a desired spacing of said frames; and lens retaining caps on said frames enclosing the ends of the horns of said hooks for retaining said nose-bridge in engagement with said hooks to maintain said spacing of said frames.

3. In a pair of goggles having lens frames and a flexible, apertured, nose-bridge for connecting said frames; a hook mounted on one of said frames and having a horn extending adjacent the side of said frame with its end positioned to be engaged in apertures of said nose-bridge for connecting said frames in desired spaced relation; and a lens retaining cap on said frame enclosing said end of said horn for retaining said nose-bridge engaged with said hook.

4. In goggles of the type described; lens frames each provided with a recess at one side thereof; lens retaining caps, a flexible nose-bridge for connecting said frames in spaced relation; a bridge retaining hook, said hook comprising; a base mounted in the recess of one of said frames and a horn projecting from said base with at least the end thereof confined between a portion of the lens cap associated with said frame and the base of said recess.

5. In goggles having a pair of lens frames and a flexible nose-bridge for connecting said frames, said bridge having apertured portions; a bridge retaining hook, said hook comprising; a base secured to one of said frames and a rigid horn projecting from said base and extending adjacent the side of said frame with its end positioned to permit a selected aperture of said bridge to be slipped thereover for adjustably attaching said nose bridge to said frame; a lens retaining cap mounted on said frame; and means on said cap for confining at least the end of said horn between the inner side of said cap and said frame to maintain said nose-bridge engaged with said hook.

6. In goggles having a pair of lens frames, lens retaining caps mounted on said frames, and a nose-bridge chain for connecting said frames, a bridge retaining hook, said hook comprising; a base secured to one of said frames; a flexible horn projecting from said base with its end normally confined within the lens cap on said frame and engaging the associated lens; and reversely extending hook portions between said horn and said base forming a bight closed by the engagement of the end of said horn with said lens for retaining a chain link within said bight, said horn being adapted to be bent outwardly on removal of said lens cap to position its end outwardly of said frame for permitting the links of said chain to be slipped over said end and engaged with or disengaged from the bight of said hook.

7. In goggles of the type described, lens frames each provided with a recess at one side thereof; a flexible nose-bridge for connecting said frames; a bridge retaining hook, said hook comprising; a horn extending within said recess at the side of one of said frames and adapted to connect said nose-bridge to said frame; and a base to which said horn is connected, said base being mounted in the recess of said frame and having a slot for receiving a portion of said horn.

8. In goggles having a pair of lens frames and a nose bridge, having apertured portions, for connecting said frames; a bridge retaining member comprising, a base secured to one of said frames and a hook projecting from said base and having reversely extending portions forming a bight and an end portion positioned to permit an apertured-portion of said bridge to be slipped thereover for engagement with the bight of said hook to adjustably attach said bridge to said frame, said hook having between its juncture with said base and said bight a portion relatively larger than the aperture of said bridge for maintaining said bridge portion outwardly of said base when engaged with said bight.

9. In goggles having lens frames and a nose-bridge chain for connecting the latter; a bridge retaining hook secured to one of said frames and having an end-portion positioned to be engaged by a link of said chain for attaching said bridge to said frame; and a lateral projection on said hook end portion for facilitating sidewise engagement of a chain link with said hook.

10. In goggles having a pair of lens frames each provided with a recess at one side thereof, and an apertured nose-bridge for connecting said frames; a bridge retaining hook comprising a base mounted in the recess of one of said frames and a horn projecting from said base and having a reversely extending end portion engageable by said nose-bridge for adjustably attaching the latter to said frame; and a lens retaining cap mounted on said frame and having a portion disposed between the base of said hook and the end portion of said horn to enclose said base within its frame recess and to frictionally contact against the reversely extending end portion of said horn for locking said nose-bridge in engagement with said hook.

HARRY F. SHINDEL.